United States Patent
Slik

(10) Patent No.: US 11,347,691 B2
(45) Date of Patent: May 31, 2022

(54) METHODS FOR MANAGING STORAGE IN A DISTRIBUTED DE-DUPLICATION SYSTEM AND DEVICES THEREOF

(71) Applicant: NetApp, Inc., Sunnyvale, CA (US)

(72) Inventor: David Slik, Northridge, CA (US)

(73) Assignee: NETAPP, INC., Sunnyvale, CA (US)

( * ) Notice: Subject to any disclaimer, the term of this patent is extended or adjusted under 35 U.S.C. 154(b) by 473 days.

(21) Appl. No.: 15/233,519

(22) Filed: Aug. 10, 2016

(65) Prior Publication Data

US 2018/0046687 A1     Feb. 15, 2018

(51) Int. Cl.
*G06F 16/00*     (2019.01)
*G06F 16/174*    (2019.01)

(52) U.S. Cl.
CPC ................. *G06F 16/1752* (2019.01)

(58) Field of Classification Search
None
See application file for complete search history.

(56) References Cited

U.S. PATENT DOCUMENTS

| | | | | |
|---|---|---|---|---|
| 8,095,790 B2* | 1/2012 | Takashima | ........ | G11B 20/00115 713/165 |
| 8,527,544 B1* | 9/2013 | Colgrove | .............. | G06F 3/0608 707/791 |
| 8,775,562 B2* | 7/2014 | Chavez | ................. | H04L 67/104 709/218 |
| 9,047,304 B2* | 6/2015 | Yakushev | ........... | G06F 16/1748 |
| 9,304,866 B1* | 4/2016 | Gardner | .............. | G06F 11/1453 |
| 9,626,518 B2* | 4/2017 | Gardner | ................ | G06F 3/0641 |
| 2002/0194209 A1* | 12/2002 | Bolosky | ................ | G06F 16/137 |
| 2012/0016839 A1* | 1/2012 | Yueh | ..................... | G06F 16/128 707/624 |
| 2013/0179684 A1* | 7/2013 | Furukawa | ............. | G06F 21/602 713/165 |

* cited by examiner

*Primary Examiner* — Debbie M Le
(74) *Attorney, Agent, or Firm* — Troutman Pepper Hamilton Sanders LLP (Rochester)

(57) ABSTRACT

A method, non-transitory computer readable medium, and device that assists with managing storage in a distributed deduplication system includes receiving an object to be stored from a client computing device. The received object is divided into a plurality of fragments. A plaintext hash value and a ciphertext hash value is determined for each of the plurality of fragments, wherein each of the plurality of fragments is renamed with the corresponding determined ciphertext hash value. Each of the renamed plurality of fragments are stored in a plurality of storage repositories.

18 Claims, 5 Drawing Sheets

METHODS FOR MANAGING STORAGE IN A DISTRIBUTED DE-DUPLICATION SYSTEM AND DEVICES THEREOF

FIELD

This technology generally relates to data storage management and, more particularly, methods for managing storage in a distributed de-duplication system and devices thereof.

BACKGROUND

In many data systems, broadly viewed, a client (acting as a data source) sends data to a server (a data storage system) via a communications channel, along with instructions for the server to retain the data. At a future time, a client (acting as a data destination) sends instructions to the server to request retained data via a communication channel, and receives the requested data from the server. An example of such a system is a data storage system; however, these data systems may include any system in which a server somehow processes, stores and transmits data uploaded from a sender. In many such systems, large amounts of data may need to be exchanged between the client and the server via the communications channel, and large amounts of data may need to be stored over long periods of time. However, communications channels generally have bandwidth constraints and usage costs, and data storage devices generally have capacity constraints and usage costs. Thus, it is a goal of such data systems is to get as much usable data across the communications channel to the server as possible, and to consume as little of the storage capacity as possible.

Data deduplication refers to techniques for reducing or eliminating redundant data in such systems, for example to improve storage utilization in a data storage system and/or to reduce bandwidth usage on the communications channel. Prior de-duplication architectures require deep integration into the storage system, including the addition of low-latency distributed databases, complex fault recovery systems to prevent inconsistent states, and integration at multiple points within the in-band data path. Additionally, most of the complexity associated with de-duplication arises from creating scalable shared databases that store the fingerprints of chunks of data. These databases are used to look up and identify matching fingerprints when data is stored or retrieved. These databases are complex to develop and maintain, especially when system capacity and geographic scope is scaled.

DETAILED DESCRIPTION

Figure 1:
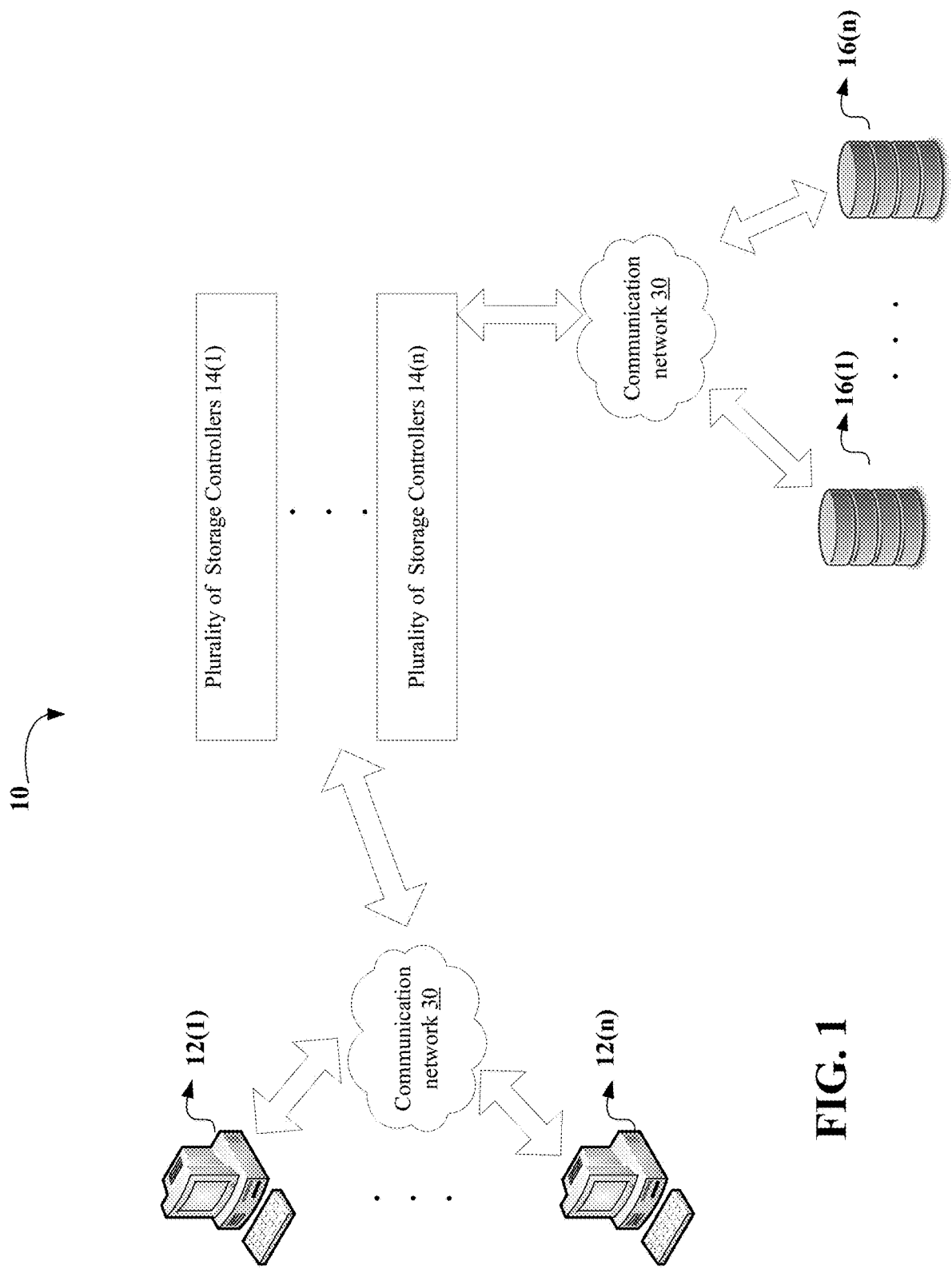
FIG. 1 is a block diagram of an environment with a plurality of storage controllers that manages storage in a distributed de-duplication system.

An environment 10 with a plurality of client computing devices 12(1)-12(n), an exemplary plurality of storage controllers 14(1)-14(n), and a plurality of storage repositories 16(1)-16(n), is illustrated in FIG. 1. In this particular example, the environment 10 in FIG. 1 includes the plurality of client computing devices 12(1)-12(n), the plurality of storage controllers 14(1)-14(n), and a plurality of storage repositories 16(1)-16(n), coupled via one or more communication networks 30, although the environment could include other types and numbers of systems, devices, components, and/or other elements. The plurality of client computing devices 12(1)-12(n), the plurality of storage controllers 14(1)-14(n), and the plurality of storage repositories 16(1)-16(n), may exist at a specific geographic or network location, may be spread across multiple geographic or network locations, or may be partially or completely virtualized in a cloud environment. The example of a method for managing storage in a distributed de-duplication system is executed by the plurality of storage controllers 14(1)-14(n), although the approaches illustrated and described herein could be executed by other types and/or numbers of other computing systems and devices or individually by the plurality of storage controllers 14(1)-14(n). The environment 10 may include other types and numbers of other network elements and devices, as is generally known in the art and will not be illustrated or described herein. This technology provides a number of advantages including providing methods, non-transitory computer readable media and devices for managing storage in a distributed de-duplication system.

Figure 2:
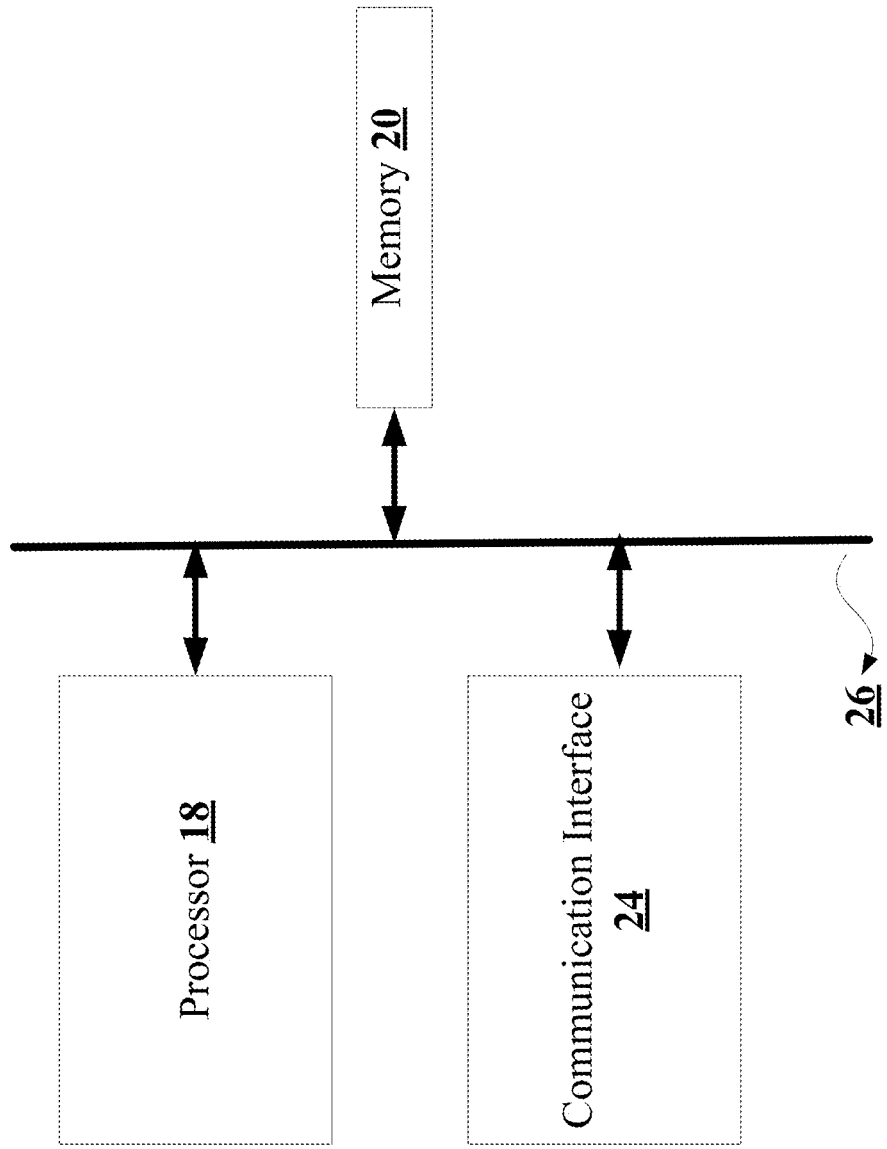
FIG. 2 is a block diagram of the exemplary storage controller shown in FIG. 1.

Referring to FIG. 2, in this example each of the plurality of storage controllers 14(1)-14(n) includes a processor 18, a memory 20, and a communication interface 24 which are coupled together by a bus 26, although the plurality of storage controllers 14(1)-14(n) may include other types and numbers of elements in other configurations.

The processor 18 of each of the plurality of storage controllers 14(1)-14(n) may execute one or more programmed instructions stored in the memory 20 for storage management operations as illustrated and described in the examples herein, although other types and numbers of functions and/or other operation can be performed. The processor 18 of the plurality of storage controllers 14(1)-14(n) may include one or more central processing units ("CPUs") or general purpose processors with one or more processing cores, such as ARM® processor(s), although other types of processor(s) could be used (e.g., Intel®).

The memory 20 of each of the plurality of storage controllers 14(1)-14(n) stores the programmed instructions and other data for one or more aspects of the present technology as described and illustrated herein, although some or all of the programmed instructions could be stored and executed elsewhere. A variety of different types of memory storage repositories, such as a non-volatile memory, random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20.

The communication interface 24 of each of the plurality of storage controllers 14(1)-14(n) operatively couples and communicates with the plurality of client computing devices 12(1)-12(n), and the plurality of storage repositories 16(1)-16(n), which are all coupled together by the communication networks 30, although other types and numbers of communication networks or systems with other types and numbers of connections and configurations to other devices and elements. By way of example only, the communication network 30 can use TCP/IP over Ethernet and industry-standard protocols, including NFS, CIFS, S3, CDMI, HTTP and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like. In this example, the bus 26 is a PCI bus, although other bus types and links may be used, such as PCI-Express or hyper-transport bus.

Each of the plurality of client computing devices 12(1)-12(n) includes a central processing unit (CPU) or processor, a memory, and an I/O system, which are coupled together by a bus or other link, although other numbers and types of network devices could be used. The plurality of client computing devices 12(1)-12(n) communicates with the plurality of storage controllers 14(1)-14(n) for storage management, although the client computing devices 12(1)-12(n) can interact with the plurality of storage controllers 14(1)-14(n) for other purposes. By way of example, the plurality of client computing devices 12(1)-12(n) may run application(s) that may provide an interface to make requests to access, modify, delete, edit, read or write data within the plurality of storage repositories 16(1)-16(n) via the communication network 30.

Each of the plurality of storage repositories 16(1)-16(n) includes a central processing unit (CPU) or processor, and an I/O system, which are coupled together by a bus or other link, although other numbers and types of network devices could be used. Each plurality of storage repositories 16(1)-16(n) assists with storing data, although the plurality of storage repositories 16(1)-16(n) can assist with other types of operations such as storing of files or structured objects. Various network processing applications, such as CIFS applications, NFS applications, HTTP storage device applications, and/or FTP applications, may be operating on the plurality of storage repositories 16(1)-16(n) and transmitting data (e.g., files or web pages) in response to requests from the plurality of storage controllers 14(1)-14(n), and the plurality of client computing devices 12(1)-12(n). It is to be understood that the plurality of storage repositories 16(1)-16(n) may include hardware such as hard disk drives, solid state devices (SSD), or magnetic tapes, or software or may represent a system with multiple external resource servers, which may include internal or external networks.

Although the exemplary network environment 10 includes the plurality of client computing devices 12(1)-12(n), the plurality of storage controllers 14(1)-14(n), and the plurality of storage repositories 16(1)-16(n) described and illustrated herein, other types and numbers of systems, devices, components, and/or other elements in other topologies can be used. It is to be understood that the systems of the examples described herein are for exemplary purposes, as many variations of the specific hardware and software used to implement the examples are possible, as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

An example of a method for managing storage in a distributed de-duplication system will now be described herein with reference to FIGS. 1-5. The exemplary method begins at step 305 where one of the plurality of storage controllers 14(1)-14(n) receives an object or file to be stored into one of the plurality of repositories 16(1)-16(n) from one of the plurality of client computing devices 12(1)-12(n), although the plurality of storage controllers 14(1)-14(n) can receive other types or amounts of data from other devices.

Next in step 310, the receiving one of the plurality of storage controllers 14(1)-14(n) caches the received object or file into a cache within memory 20, although the plurality of storage controllers 14(1)-14(n) can store the object or file it at other transitory or non-transitory memory storage locations.

In step 315, the receiving one of the plurality of storage controllers 14(1)-14(n) determines when the cached object or file is compressed or encrypted or otherwise unlikely to benefit from deduplication. Accordingly, when the receiving one of the plurality of storage controllers 14(1)-14(n) determines that the cached object or file is compressed, encrypted, or otherwise is unlikely to benefit from deduplication then the Yes branch is taken to step 350 which will be further illustrated below. In this example, when the cached object or file is either compressed or encrypted it means that there is low probability that deduplication processing will reduce the network and storage consumption associated with the object or the file.

However back in step 315, when the receiving one of the plurality of storage controllers 14(1)-14(n) determines that the cached object is neither compressed nor encrypted, and that deduplication will likely reduce the network and storage consumption associated with storing the object or the file, then the No branch is taken to step 320.

In step 320, the receiving one plurality of storage controllers 14(1)-14(n) fragments the cached object or file. Prior to fragmenting, the receiving one of the plurality of storage controllers 14(1)-14(n) compresses the object. In this example, fragmenting of the object or file relates to splitting the object or file into multiple fragments of equal or variable size, although other types or techniques of fragmenting can also be performed by the receiving one of plurality of storage controllers 14(1)-14(n) on the cached object or file.

Next in step 325, the receiving one of the plurality of storage controllers 14(1)-14(n) computes the plaintext hash value for each of the fragments of the cached object or file using one or more hashing algorithms easily recognizable by a person having ordinary skill in the art, although other hashing techniques can be used to compute a plaintext hash for each of the fragment. Additionally upon computing the plaintext hash value for the fragment, the receiving one of the plurality of storage controllers 14(1)-14(n) also obtains the tenant key associated with the requesting one of the plurality of client computing devices 12(1)-12(n) that was noted at the time of initializing the client computing device from memory 20, although the tenant key can be obtained from other memory locations.

Next in step 330, the receiving one of the plurality of storage controllers 14(1)-14(n) computes the encrypted fragment key for each of the fragments using the computed fragment plaintext hash, and the obtained tenant key, although the receiving one of the plurality of storage controllers 14(1)-14(n) can compute the encrypted fragment key using other techniques or parameters. Using the computed encrypted fragment key, the receiving one of the plurality of storage controllers 14(1)-14(n) encrypts each of the fragments with their corresponding computed fragment key, although the fragment can be encrypted using other techniques or parameters.

Next in step 335, the receiving one of the plurality of storage controllers 14(1)-14(n) computes ciphertext hash value for each of the fragments by hashing the contents of the encrypted fragment, although the receiving one of the plurality of storage controllers 14(1)-14(n) can use other techniques or parameters to compute the ciphertext hash. Additionally in this example, once the ciphertext hash values are computed, the names of each of the encrypted fragments are replaced with their corresponding computed ciphertext hash value.

Next in step 340, the receiving one of the plurality of storage controllers 14(1)-14(n) for each of the fragment (with the name equal to the computed ciphertext hash value) determines when there is already an existing fragment with the same name stored in the plurality of storage repositories 16(1)-16(n), although the storage management computing device can make their determination at other memory locations. In this example, when the receiving one of the plurality of storage controllers 14(1)-14(n) determines that the fragment with the same name exists, then there is deduplication with the fragment. However, when the fragment with the same name does not exists then there is no deduplication. Accordingly, when the receiving one of the plurality of storage controllers 14(1)-14(n) determines that a fragment exists with the same name, then the Yes branch is taken to step 345.

In step 345, the receiving one of the plurality of storage controllers 14(1)-14(n) does not store the fragments in the plurality of storage repositories 16(1)-16(n) and the exemplary method ends. By not sending the fragment, the technology disclosed herein avoids storing duplicate data in the plurality of storage repositories 16(1)-16(n) and also saves the bandwidth during storing the fragment that is already present.

However back in step 340, when the receiving one of the plurality of storage controllers 14(1)-14(n) determines that determines that an object or fragment does not exists with the same name, then the No branch is taken to step 350.

In step 350, the receiving one of the plurality of storage controllers 14(1)-14(n) stores the object or the fragment with in the name of the computed ciphertext value and the exemplary method ends at step 350. Additionally in this example, the receiving one of the plurality of storage controllers 14(1)-14(n) stores the computed plaintext hash values, and the ciphertext hash values associated with the original object as a separate recipe object in the plurality of storage repositories 16(1)-16(n), although the hash values can be stored at other memory locations. Optionally, the recipe object can also be encrypted for the purpose of data security. In this example, a namespace which maps the object name to a series of plaintext and ciphertext hashes is obtained from the recipe object retrieved from the plurality of storage repositories 16(1)-16(n), although the namespace can be stored at other memory locations. Further in this example, the plurality of client computing devices 12(1)-12(n) that share the same tenant key, objects can be transferred by just providing access to the recipe object or the contents of the recipe. Accordingly, the technology disclosed herein provides a low-bandwidth way to transfer objects between systems, and to synchronize updates to objects.

Figure 4:
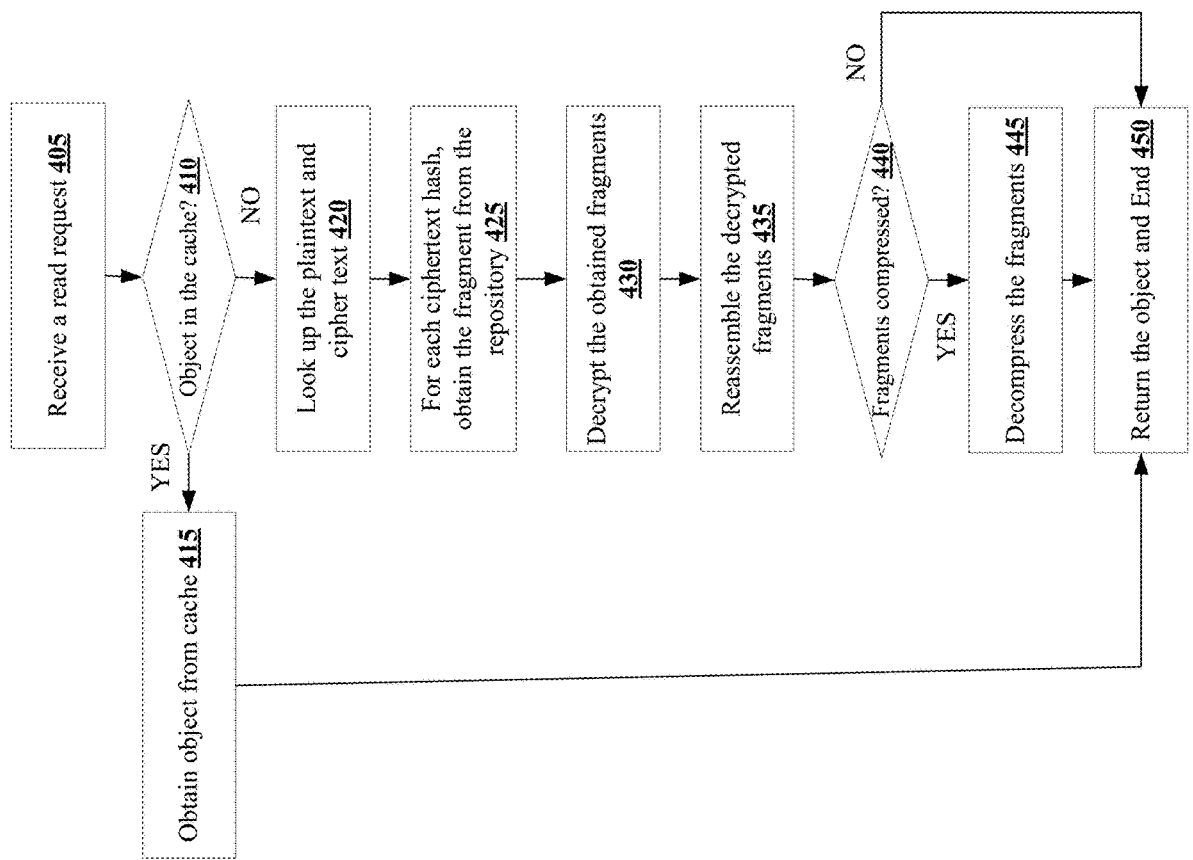

Now an exemplary method of managing a read or GET request will now be illustrated with reference to FIG. 4. In the first step 405, one of the plurality of storage controllers 14(1)-14(n) receives a read or GET request for an object or file from one of the plurality of client computing devices 12(1)-12(n), although the plurality of storage controllers 14(1)-14(n) can receive other types or amounts of requests. In this example, the read or the GET request includes the name of the object or the file, although the received request can include other types or amounts of information.

Next in step 410, the receiving one of the plurality of storage controllers 14(1)-14(n) determines when the requested object is in the cache within memory 20, although the receiving one of plurality of storage controllers 14(1)-14(n) can also determine when the object is present at other memory locations and can also check with the plurality of storage repositories 16(1)-16(n) to ensure that the cache is not stale. Accordingly, when the receiving one of the plurality of storage controllers 14(1)-14(n) determines that the request object is within the cache of the memory 20, then the Yes branch is taken to step 415.

In step 415, the receiving one of the plurality of storage controllers 14(1)-14(n) obtains the requested object from the cache and the exemplary flow proceeds to step 450 where the requested object is returned back to the requesting one of the plurality of client computing devices 12(1)-12(n) and the flow ends.

However, back in step 410 when the receiving one of the plurality of storage controllers 14(1)-14(n) determines that the requested object or file is not present in the cache, then the Yes branch is taken to step 420.

In step 420, the receiving one of the plurality of storage controllers 14(1)-14(n) identifies or performs a lookup plaintext and ciphertext hashes locally within memory 20 or uses the name of the requested object to obtain the plaintext and ciphertext hashes from the recipe object stored in the plurality of storage repositories 16(1)-16(n), although the selected in-band storage management computing device 14 can use other techniques or parameters to lookup the plaintext and ciphertext hashes.

In step 425, the receiving one of the plurality of storage controllers 14(1)-14(n) for each of the ciphertext hash value obtains the fragments associated with the requested object or file from the plurality of storage repositories 16(1)-16(n), although the receiving one of the plurality of storage controllers 14(1)-14(n) can obtain the fragments from other memory locations. In this example, each of the fragment obtained from the plurality of storage repositories 16(1)-16(n) is encrypted using the technique previously illustrated in FIG. 3.

Next in step 430, the receiving one of the plurality of storage controllers 14(1)-14(n) verifies and decrypts each of the obtained encrypted fragments using the plaintext hash value corresponding to the ciphertext hash value; and also the tenant key associated with the requesting one of the plurality of client computing devices 12(1)-12(n), although the receiving one of the plurality of storage controllers 14(1)-14(n) can use other techniques to perform the decryption.

Figure 3:
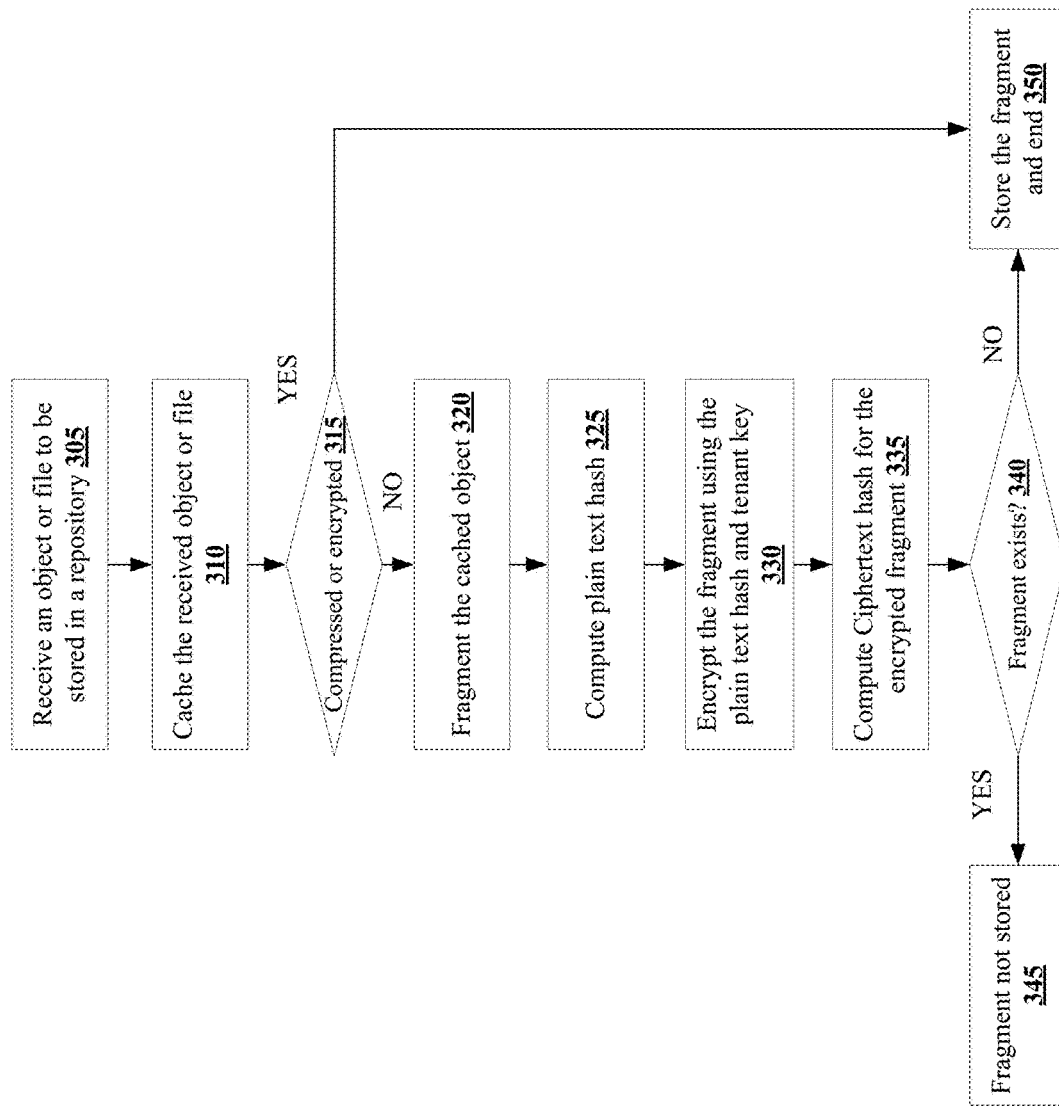
FIGS. 3-5 are exemplary flow charts of an example of a method for managing storage in a distributed de-duplication system.

In step 435, the receiving one of the plurality of storage controllers 14(1)-14(n) verifies each of the decrypted fragments using the plaintext hash value, and begins to reassemble the decrypted fragments associated with the requested object. In this example, reassembling of the fragments is required because as illustrated in FIG. 3, the objects are split into multiple fragments and stored at the plurality of storage repositories 16(1)-16(n) and so reassembling is required to generate the complete requested object.

Next in step 440, the receiving one of the plurality of storage controllers 14(1)-14(n) determines if the reassembled fragments are compressed. In this example, the fragments stored at the plurality of storage repositories 16(1)-16(n) can be compressed and stored to utilize the storage memory space efficiently, although the fragments can be compressed for other purposes. Accordingly, when the receiving one of the plurality of storage controllers 14(1)-14(n) determines that the reassembled fragments are not compressed, then the No branch is taken to step 450 which will be further illustrated below.

However when the receiving one of the plurality of storage controllers 14(1)-14(n) determines that the fragments are compressed, then the Yes branch is taken to step 445.

In step 445, the receiving one of the plurality of storage controllers 14(1)-14(n) decompresses the compressed fragments using data decompressing algorithms which are easily recognizable by a person having ordinary skill in the art, although the receiving one of the plurality of storage controllers 14(1)-14(n) can use other techniques to decompress the fragments.

Next in step 450, the receiving one of the plurality of storage controllers 14(1)-14(n) returns the requested object back to the requesting one of the plurality of client computing devices 12(1)-12(n) and the exemplary method ends at step 450.

Figure 5:
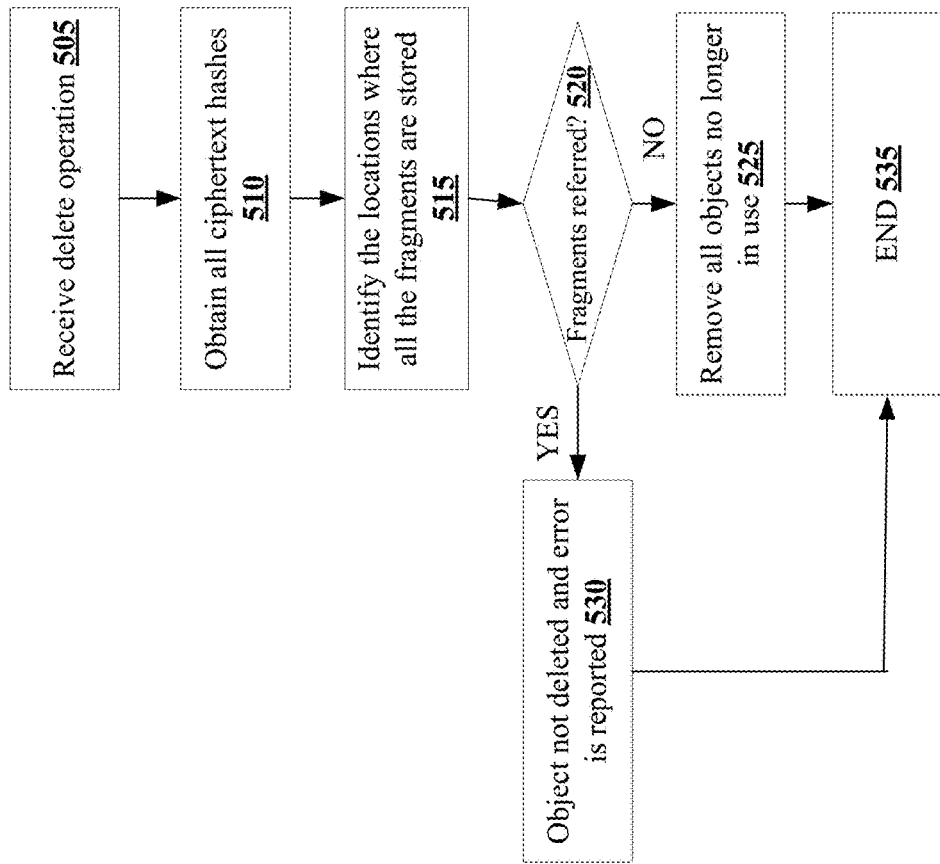

Next an exemplary method for deleting the object will now be illustrated with reference to FIG. 5. The exemplary method beings at step 505 where one of the plurality of storage controllers 14(1)-14(n) receives a delete object or file request from one of the plurality of client computing devices 12(1)-12(n), although the plurality of storage controllers 14(1)-14(n) can receive other types or amounts of information. In this example, the Delete request includes the name of the object or the file, although the received Delete request can include other types or amounts of information. While this method is illustrated upon receipt of the Delete request, the receiving one of the plurality of storage controllers 14(1)-14(n) can perform the operation of deleting the objects periodically in other examples.

Next in step 510, the receiving one of the plurality of storage controllers 14(1)-14(n) removes all the stored ciphertext and the plaintext hashes by deleting the recipe object stored in the plurality of storage repositories 16(1)-16(n), although the receiving one of the plurality of storage controllers 14(1)-14(n) can delete the ciphertext and the plaintext hashes from other memory locations.

Next in step 515, the receiving one of the plurality of storage controllers 14(1)-14(n) periodically identifies all of the plurality of storage repositories 16(1)-16(n) storing the fragments associated with the ciphertext hashes obtained from the recipe objects, although the receiving one of the plurality of storage controllers 14(1)-14(n) can identifies the fragments using other techniques or parameters. While this example illustrates the receiving one of the plurality of storage controllers 14(1)-14(n) performing this step, one or more storage controllers of the remaining plurality of storage controllers 14(1)-14(n) can perform this step in other examples.

Next in step 520, the receiving one of the plurality of storage controllers 14(1)-14(n) determines when the identified fragments are referred by other storage management devices. In this example, the number of recipe objects containing a given ciphertext hash is counted. Accordingly, when the receiving one of the plurality of storage controllers 14(1)-14(n) determines that the fragments are not being referred (has a count of zero), then the No branch is taken to step 525. While this example illustrates the receiving one of the plurality of storage controllers 14(1)-14(n) performing this step, one or more storage controllers of the remaining plurality of storage controllers 14(1)-14(n) can perform this step in other examples.

In step 525, the receiving one of the plurality of storage controllers 14(1)-14(n) removes or deletes all the fragments no longer in use from the plurality of storage repositories 16(1)-16(n) and the exemplary method ends at step 535. Further in this example, the receiving one of the plurality of storage controllers 14(1)-14(n) may use a locking or conditional deletion mechanism to prevent race conditions. While this example illustrates the receiving one of the plurality of storage controllers 14(1)-14(n) performing this step, one or more storage controllers of the remaining plurality of storage controllers 14(1)-14(n) can perform this step in other examples.

However back in step 520, when the receiving one of the plurality of storage controllers 14(1)-14(n) determines that the fragments are being referred, then the Yes branch is taken to step 530. While this example illustrates the receiving one of the plurality of storage controllers 14(1)-14(n) performing this step, one or more storage controllers of the remaining plurality of storage controllers 14(1)-14(n) can perform this step in other examples.

In step 530, the receiving one of the plurality of storage controllers 14(1)-14(n) does not delete the fragment and the exemplary method ends at step 535.

In this example of deleting the object, the receiving one of the plurality of storage controllers 14(1)-14(n) avoids the race condition by using protocol RFC 7232, which is hereby incorporated by reference in its entirety. As it would be appreciated by a person having ordinary skill in the art, the HTTP spec supports conditional requests (RFC 7232), including If-Unmodified-Since, prohibits an operation unless the object's creation/modification date is older than the specified data. As long as the date and time corresponding to the start of operation is used as a conditional for the DELETE operation, the race condition will not result in data being lost, as the DELETE will not be executed. While this example illustrates the receiving one of the plurality of storage controllers 14(1)-14(n) performing this step, one or more storage controllers of the remaining plurality of storage controllers 14(1)-14(n) can perform this step in other examples.

Additionally, the above illustrated write technique prevents the race condition by using the following technique after step 345 and before ending the exemplar method. In the example to prevent the race condition, the receiving one of the plurality of storage controllers 14(1)-14(n) updates the metadata for the object or perform another operation that updates the last modified time, effectively performing an operation to update the modified time on the fragment object. This technique eliminates the race condition window when the plurality of storage repositories 16(1)-16(n) have strong consistency with respect to the last modified time and the conditional delete request. Additionally, the race condition can also be solved by trying to update the object first to update modified time on the object, and then performing the fragment write when a data or object not found (such as 404 error) is sent back to the requesting one of the plurality of client computing devices 12(1)-12(n). This also has the side effect of being more efficient over the wire. Other methods of avoiding the race condition will also be easily recognizable by a person having ordinary skill in the art.

An exemplary illustration of managing snapshots of the fragments stored in the plurality of storage repositories 16(1)-16(n) will now be illustrated. To perform a global snapshot, one of the plurality of storage controllers 14(1)-14(n) computes the complete set of ciphertext hashes associated with all the fragments from stored recipe objects in the plurality of storage repositories 16(1)-16(n) or directly from the other plurality of storage controllers 14(1)-14(n), although one of the plurality of storage controllers 14(1)-14(n) can use other types or amounts of parameters to compute the reference count. To retain a non-global snapshot, the list of ciphertext hashes associated with a given state of the filesystem or collection of objects are retained by the one of the plurality of storage controllers 14(1)-14(n), although the received list can be stored at other memory locations, such as by a separate snapshot management computing device that interacts with one of the plurality of storage controllers 14(1)-14(n) using the same interface as the plurality of storage repositories 16(1)-16(n). Further in this example, for retention and compliance, fingerprints at varying scopes can be stored to prevent deletion. This has applications for compliance and legal holds, as the entire contents of the enterprise-wide storage system, including cloud storage, can be quickly protected without interfering with system operation.

Next an exemplary illustration of data storage optimization will now be illustrated. Often data needs to move from one grade of storage to another (more expensive, faster storage to less expensive, archival storage, for example). This is known as Storage Level Objective (SLO) management. First, one of the plurality of storage controllers 14(1)-14(n) receives the list of ciphertext hashes of the fragments, although the one of the plurality of storage controllers 14(1)-14(n) can receive other types or amounts of information. Along with the received fingerprints, the receiving one of the plurality of storage controllers 14(1)-14(n) also receives the desired SLO and the current repository of the plurality of storage repositories 16(1)-16(n) (location). Next, when the receiving one of the plurality of storage controllers 14(1)-14(n) determines that the current location of a fragment does not match the desired SLO, the receiving one of the plurality of storage controllers 14(1)-14(n) can transparently copy the fragment from one of the plurality of storage repositories 16(1)-(16) to another (changing SLOs). This can also be done to increase locality of access. Once the change has been completed, the recipe on the source storage repository can be deleted, and the garbage collection process performed by the receiving one of the plurality of storage controllers 14(1)-14(n) will automatically clean up the remaining fragments that can be deleted. In this example upon the completion of the change in location, the fragments of the objects at old location can be dropped if none of the plurality of client computing devices 12(1)-12(n) is accessing it any more. While this example illustrates the receiving one of the plurality of storage controllers 14(1)-14(n) performing this step, one or more storage controllers of the remaining plurality of storage controllers 14(1)-14(n) can perform this step in other examples.

Accordingly, as illustrated and described by way of the examples herein, this technology provides a number of advantages including providing methods, non-transitory computer readable media and devices for managing storage in a distributed de-duplication system. Using the above illustrated techniques, the technology disclosed herein is able to use CPU and memory resources minimally for client computing devices. Additionally using the above illustrated techniques, fragments of the objects or files can be stored without requiring modifications to the storage repositories. Furthermore, the technology disclosed does not waste computing resources on non-de-duplicable data. Additionally, the technology allows hybrid public/private cloud de-duplication and supports multi-tenant de-duplication with full tenant security isolation. The technology also improves efficiency of namespace migration between systems and tenants.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
    determining, by a computing device, a ciphertext hash value based on all content in each of a plurality of file fragments which together comprises a received file, wherein the each of the plurality of file fragments are encrypted and the ciphertext hash value is determined from each of the plurality of file fragments that are encrypted;
    renaming, by the computing device, a filename of each of the plurality of file fragments with the corresponding determined ciphertext hash value; and
    storing, by the computing device, each of the renamed plurality of file fragments in a plurality of storage repositories when the ciphertext hash value fails to match in a storage repository of the plurality of storage repositories.

2. The method as set forth in claim 1 further comprising encrypting, by the computing device, each of the plurality of file fragments using a determined plaintext hash value and a tenant key associated with a client.

3. The method as set forth in claim 1 wherein the storing further comprises:
    storing, by the computing device, each of the renamed plurality of file fragments in the plurality of storage repositories when the one or more previously stored file fragments with an existing name equal to the renamed plurality of file fragments is determined to be absent.

4. The method as set forth in claim 1 further comprising:
    obtaining, by the computing device, each of the plurality of file fragments from the plurality of storage repositories using an identified ciphertext hash value of each of the plurality of file fragments associated with the received file in a read request.

5. The method as set forth in claim 4 further comprising: reassembling, by the computing device, the plurality of file fragments to form the requested file, wherein each of the plurality of file fragments is decompressed when decrypted plurality of file fragments are determined to be compressed.

6. The method as set forth in claim 1 further comprising: deleting, by the computing device, the ciphertext hash from the plurality of storage repositories, when the ciphertext hash value is un-referenced.

7. A non-transitory computer readable medium having stored thereon instructions for managing storage in a distributed deduplication system comprising executable code which when executed by a processor, causes the processor to perform steps comprising:
determining a ciphertext hash value based on all content in each of a plurality of file fragments which together comprises a received file, wherein the each of the plurality of file fragments are encrypted and the ciphertext hash value is determined from each of the plurality of file fragments that are encrypted;
renaming a filename for each of the plurality of file fragments with the corresponding determined ciphertext hash value; and
storing each of the renamed plurality of file fragments in a plurality of storage repositories when the ciphertext hash value fails to match in a storage repository of the plurality of storage repositories.

8. The medium as set forth in claim 7 further comprising encrypting each of the plurality of file fragments using a determined plaintext hash value and a tenant key associated with a client.

9. The medium as set forth in claim 7 wherein the storing further comprises:
storing each of the renamed plurality of file fragments in the plurality of storage repositories when the one or more previously stored file fragments with an existing name equal to the renamed plurality of file fragments is determined to be absent.

10. The medium as set forth in claim 7 further comprising:
obtaining each of the plurality of file fragments from the plurality of storage repositories using an identified ciphertext hash value of each of the plurality of file fragments associated with the received file in a read request.

11. The medium as set forth in claim 10 further comprising:
reassembling the plurality of file fragments to form the requested file, wherein each of the plurality of file fragments is decompressed when decrypted plurality of file fragments are determined to be compressed.

12. The medium as set forth in claim 7 further comprising: deleting the ciphertext hash from the plurality of storage repositories, when the ciphertext hash value is un-referenced.

13. A storage controller comprising:
a processor;
a memory coupled to the processor which is configured to be capable of executing programmed instructions comprising and stored in the memory to:
determine a ciphertext hash value based on all content in each of a plurality of file fragments which together comprises a received file, wherein the each of the plurality of file fragments are encrypted and the ciphertext hash value is determined from each of the plurality of file fragments that are encrypted;
rename a filename for each of the plurality of file fragments with the corresponding determined ciphertext hash value; and
store each of the renamed plurality of file fragments in a plurality of storage repositories when the ciphertext hash value fails to match in a storage repository of the plurality of storage repositories.

14. The device as set forth in claim 13 wherein the processor coupled to the memory is further configured to be capable of executing at least one additional programmed instruction comprising and stored in the memory to encrypt each of the plurality of file fragments using a determined plaintext hash value and a tenant key associated with a client.

15. The device as set forth in claim 13 wherein the processor coupled to the memory is further configured to be capable of executing at least one additional programmed instruction comprising and stored in the memory for the storing further comprises:
store each of the renamed plurality of file fragments in the plurality of storage repositories when the one or more previously stored file fragments with an existing name equal to the renamed plurality of file fragments is determined to be absent.

16. The device as set forth in claim 13 wherein the processor coupled to the memory is further configured to be capable of executing at least one additional programmed instruction comprising and stored in the memory to:
obtain each of the plurality of file fragments from the plurality of storage repositories using an identified ciphertext hash value of each of the plurality of file fragments associated with the received file in a read request.

17. The device as set forth in claim 16 wherein the processor coupled to the memory is further configured to be capable of executing at least one additional programmed instruction comprising and stored in the memory to:
reassemble the plurality of file fragments to form the requested file, wherein each of the plurality of file fragments is decompressed when decrypted plurality of file fragments are determined to be compressed.

18. The device as set forth in claim 13 wherein the processor coupled to the memory is further configured to be capable of executing at least one additional programmed instruction comprising and stored in the memory to:
delete the ciphertext hash from the plurality of storage repositories, when the ciphertext hash value is un-referenced.

* * * * *